United States Patent
Kristoffersen et al.

(10) Patent No.: US 9,995,276 B2
(45) Date of Patent: Jun. 12, 2018

(54) CONTROL OF WIND TURBINES IN RESPONSE TO WIND SHEAR

(71) Applicant: VESTAS WIND SYSTEMS A/S, Aarhus N (DK)

(72) Inventors: Jacob Krogh Kristoffersen, Viby J (DK); Søren Sørensen, Hinnerup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days. days.

(21) Appl. No.: 15/320,209

(22) PCT Filed: Jun. 15, 2015

(86) PCT No.: PCT/DK2015/050167
§ 371 (c)(1),
(2) Date: Dec. 19, 2016

(87) PCT Pub. No.: WO2015/192856
PCT Pub. Date: Dec. 23, 2015

(65) Prior Publication Data
US 2017/0122289 A1 May 4, 2017

(30) Foreign Application Priority Data

Jun. 19, 2014 (DK) .................................. 2014 70367

(51) Int. Cl.
*G06F 19/00* (2018.01)
*F03D 7/02* (2006.01)
(Continued)

(52) U.S. Cl.
CPC ......... *F03D 7/0224* (2013.01); *F03D 1/0675* (2013.01); *F03D 7/047* (2013.01);
(Continued)

(58) Field of Classification Search
CPC combination set(s) only.
See application file for complete search history.

(56) References Cited

U.S. PATENT DOCUMENTS 7,452,185 B2* 11/2008 Ide ........................ F03D 7/0224
416/35
8,957,537 B2* 2/2015 Guadayol Roig ...... F03D 7/022
290/44
(Continued)

FOREIGN PATENT DOCUMENTS

CN 102562453 B 9/2013
DK 200800872 A 12/2008
(Continued)

OTHER PUBLICATIONS

Danish Search Report for PA 2014 70367, dated Jan. 29, 2015.
International Search Report for PCT/DK2015/050167, dated Sep. 29, 2015.

*Primary Examiner* — Kidest Bahta
(74) *Attorney, Agent, or Firm* — Patterson + Sheridan, LLP (57) ABSTRACT

A wind turbine is controlled in response to an estimate of vertical and/or horizontal wind shear. A tilt moment is estimated from flapwise and edgewise blade bending moments, azimuth and blade pitch positions and used to estimate vertical wind shear. A yaw moment is also estimated from flapwise and edgewise blade bending moments, azimuth and pitch position and used to estimate horizontal wind shear. A tip speed ratio is determined from an estimate of wind velocity over the rotor plane and is used to set a blade pitch angle which is passed to a blade pitch controller. The pitching may be collective or individual. In the latter case, the tip speed ratio is determined from a plurality of rotor plane positions to derive a cyclic pitch reference for each blade.

17 Claims, 6 Drawing Sheets

(51) Int. Cl.
*F03D 1/06* (2006.01)
*F03D 7/04* (2006.01)
(52) U.S. Cl.
CPC ..... *F05B 2270/304* (2013.01); *F05B 2270/32* (2013.01); *F05B 2270/328* (2013.01); *F05B 2270/329* (2013.01); *F05B 2270/331* (2013.01)

(56) References Cited

U.S. PATENT DOCUMENTS

| | | | | |
|---|---|---|---|---|
| 2009/0220340 A1* | 9/2009 | Pierce | .................. | F03D 7/0224 416/36 |
| 2010/0014969 A1* | 1/2010 | Wilson | .................. | F03D 7/0224 416/1 |
| 2010/0092292 A1* | 4/2010 | Nies | ..................... | F03D 7/0224 416/41 |
| 2011/0140431 A1* | 6/2011 | Landa | .................. | F03D 7/0224 290/44 |
| 2011/0316277 A1* | 12/2011 | Skaare | ................. | F03D 7/0224 290/44 |
| 2012/0056426 A1* | 3/2012 | Van Kuik | ............. | F03D 7/0224 290/44 |

FOREIGN PATENT DOCUMENTS

| | | | |
|---|---|---|---|
| EP | 2096300 | A2 | 9/2009 |
| EP | 2175131 | A2 | 4/2010 |
| EP | 2306006 | A2 | 4/2011 |
| EP | 2500562 | A2 | 9/2012 |
| EP | 2520793 | A2 | 11/2012 |
| EP | 2719893 | A1 | 4/2014 |
| WO | 9842980 | A1 | 10/1998 |
| WO | 2011150931 | A2 | 12/2011 |

* cited by examiner

CONTROL OF WIND TURBINES IN RESPONSE TO WIND SHEAR

FIELD OF THE INVENTION

This invention relates to wind turbines and to methods of controlling wind turbines. It is particularly concerned with the control of wind turbines in response to wind shear.

BACKGROUND TO THE INVENTION

It is generally desirable to optimise the power output by a wind turbine. During periods of high wind shear the power output may be optimised by changing the pitch angle of the blades. Blade pitch control is well known in the wind turbine field. Most commercial wind turbines use collective pitch control in which the pitch of all blades is controlled by changing a common pitch reference. However, it is also known to use a cyclic individual pitch control according to which the pitch of each blade is controlled cyclically as it rotates. The three turbine blades may have a common control which applies a cyclic control to each blade offset by 120°.

It is presently known to optimise power output based on an optimal collective pitch angle which is determined from nacelle wind speed and rotor speed. Thus, the wind speed on which the correction is based is the wind speed as measured at the nacelle. However, the wind speed across the length of the blade and around the plane of rotation can vary enormously. With a standard roughness induced wind shear profile, the wind speed at the top and the bottom of the rotor plane, that is furthest from and nearest to the ground, can vary by +10% to −15% respectively compared to the wind speed as measured at the nacelle. In cases of higher shears, these deviations may be from +30% at the top and −40% at the bottom. In consequence, as the operating pitch set points are determined by nacelle wind speed, the turbine is not operated at optimum set points over the entire sweep of the rotor plane.

SUMMARY OF THE INVENTION

According to the invention there is provided a method of controlling a wind turbine having a rotor and a plurality of rotor blades, comprising obtaining a wind speed value, determining blade loading comprising determining blade bending moments, estimating a component of vertical wind shear across the rotor plane from the wind speed value and an estimate of main bearing tilt moment derived from the blade bending moments, a measure of blade pitch and azimuth angle, determining the tip speed ratio from the wind speed value and the wind velocity over the rotor plane, selecting a curve of tip speed ratio against blade pitch angle based on the estimated vertical wind shear component, selecting a blade pitch angle based on the selected curve and the tip speed ratio, and adjusting the blade pitch in accordance with the selected blade pitch angle.

The invention also provides a control system for a wind turbine having a rotor and a plurality of rotor blades, the control system comprising a blade load sensor, an azimuth position sensor, a blade pitch position sensor, and a processor for estimating a component of vertical wind shear across the rotor plane, the processor determining flapwise blade bending moments from signals from the blade load sensors, determining an estimate of main bearing tilt moment from the flapwise blade bending moments and the blade pitch position and azimuth position, and estimating the vertical wind shear from the main bearing tilt moment and the wind speed, the processor determining a tip speed ratio from a measure of wind velocity over the rotor plane, and a store of curves of tip speed ratio and blade pitch reference for a given vertical wind shear, the processor determining a blade pitch angle from one of the set of curves based on the estimated vertical wind shear and the tip speed ratio, and a controller for adjusting the pitch angle of at least one of the rotor blades in accordance with the determined blade pitch angle.

Measurements of blade loading may be readily available to a wind turbine controller. Blade loading is measured for many other control purposes. For example, using strain gauges or fibre optical sensors located on the rotor blades.

The measure of wind shear may be used to estimate the wind velocity over the rotor plane which is used in calculation of the tip speed ratio. Tip speed ratio ($\lambda$) is a well known ratio of the speed of rotation of the tip of the rotor blades to the wind velocity.

The estimated vertical wind shear may advantageously take into account yaw error to improve the estimate further.

The wind speed is advantageously determined at the wind turbine nacelle although a wind speed measurement derived or sensed elsewhere may be used.

The blade pitch angle may be a collective blade pitch angle applied to adjust all of the plurality of rotor blades. Alternatively, the blade pitch angle may be an individual blade pitch angle and the selection of the blade pitch angle is performed for each of the plurality of rotor blades.

In the individual blade pitch angle embodiment the tip speed ratio may be determined at a plurality of positions on the rotor plane and the blade pitch angle selected for each of the plurality of positions. This enables the pitch angle to follow a curve of optimal power coefficient factor Cp at a given tip speed ratio.

The invention also provides a method of controlling a wind turbine having a rotor and a plurality of rotor blades, comprising obtaining a wind speed value, determining blade loading comprising determining blade bending moments, estimating a component of horizontal wind shear across the rotor plane from an estimate of main bearing yaw moment derived from the blade bending moments, azimuth angle and blade pitch position, determining the tip speed ratio from the wind speed and the wind velocity over the rotor plane, selecting a curve of tip speed ratio against blade pitch angle based on the estimated horizontal wind shear component, selecting a blade pitch angle based on the selected curve and the tip speed ratio, and adjusting the blade pitch in accordance with the selected blade pitch angle.

The invention further provides a control system, wherein the processor determines the tip speed ratio of a plurality of positions on the rotor plane and determines a pitch angle for each of the plurality of positions.

Embodiments of the invention have the advantage that a measure of wind shear may easily be estimated using sensors and parameters that are readily available on a wind turbine. The estimated wind shear can then be used, in conjunction with a collective or individual blade pitch strategy to control the turbine blades such that power output can be increased when shear conditions are present across the rotor blade either in the horizontal or vertical directions or both.

BRIEF DESCRIPTION OF DRAWINGS

Embodiments of the invention will now be described, by way of example only, and with reference to the accompanying drawings, in which.

The following description approaches the optimisation of power output under shear conditions from three aspects: the estimation of shear; a collective pitch controller operation on estimated shear; and, alternatively, an individual pitch controller based on shear. Although the embodiments described are suitable for use in high wind shear conditions, the invention is not limited to high shear conditions. However, it will be appreciated that the contribution to power optimisation made by embodiments of the invention will decrease as shear decreases. For the avoidance of doubt, the invention is not limited to any particular type of shear and includes, but is not limited to, vertical and horizontal wind shear.

Figure 1:
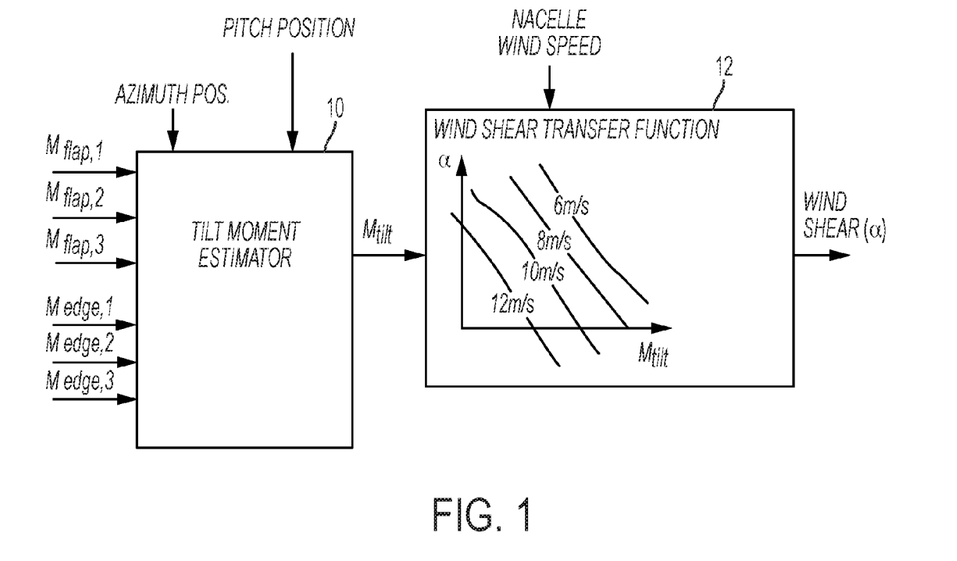
FIG. 1 is a schematic view of a vertical wind shear estimator embodying the invention.

FIG. 1 shows a schematic of a vertical wind shear estimator. As with all embodiments of the invention described herein, this may be embodied in an on-board wind turbine controller either separately or in addition to existing control functions. Alternatively, it could form part of a power plant controller and be located remote from the turbine. The controller comprises a processor and related hardware components including memory and receives inputs from a plurality of sensors which sense parameters that affect operation of the wind turbine.

Figure 2:
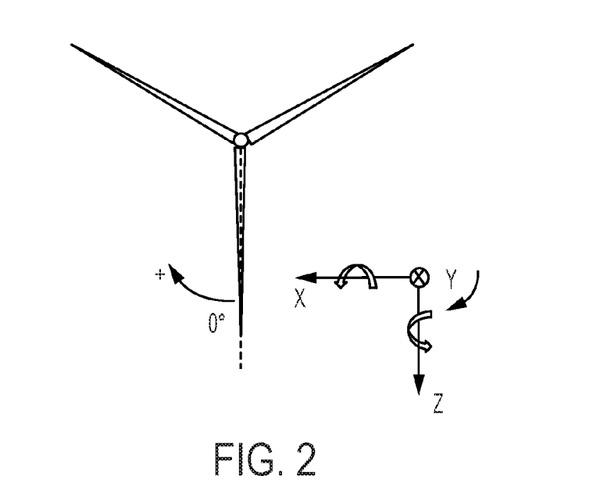
FIG. 2 is an exemplary drawing illustrating the x and z axes of a wind turbine rotor.

FIG. 1 shows a main bearing tilt moment estimator 10 which receives as its inputs the azimuth position, the pitch position and a blade edgewise and flapwise bending moment from each blade. In this example, there are three blades providing three flapwise bending moments, $M_{flap}1$, $M_{flap}2$ and $M_{flap}3$ and three edgewise bending moments, $M_{edge1}$, $M_{edge}2$ and $M_{edge}3$. The flapwise bending moment is the out-of-plane of rotation bending moment and thus very sensitive to blade pitching. The calculation of blade flapwise bending moments is well known in the art and may be calculated using strain sensors, for example. The blade edgewise bending moments may be calculated, also using strain sensors for example, or estimated. The tilt moment is defined as the tilt moment of the main bearing around the x axis. For ease of understanding, FIG. 2 illustrates a wind turbine rotor showing the three blades as blade 1, blade 2 and blade 3 together with x and z axes.

The azimuth position is a measure of the position of the blades at any given time as they rotate. The azimuth position in the rotor plane is defined as the angle between a first blade and the z axis. Separate azimuth positions may be calculated for each blade although all positions may be calculated from a single measurement.

The tilt moment estimator estimates tilt moments from the flapwise bending moments, an estimate or measure of edgewise bending moments, pitch position and azimuth positions and outputs a tilt moment signal $M_{tilt}$. The tilt moments may be estimated using the well known Coleman coordinate transformation.

The estimated tilt moments form an input to a wind shear transfer function 12 which also receives a measure of nacelle wind speed. The pitch position may be individual or collective. The nacelle wind speed may be measured by a variety of means such as a nacelle mounted anemometer. The wind speed need not be measured at the nacelle, but may be measured, for example, at some other point on the wind turbine, or even in advance using a Lidar or other remote sensing device. Alternatively the wind speed may be estimated.

The wind shear transfer function estimates the vertical wind shear a for a given input wind speed. This may comprise a store or memory storing curves of wind shear against tilt moment for a plurality of wind speeds.

Figure 3:
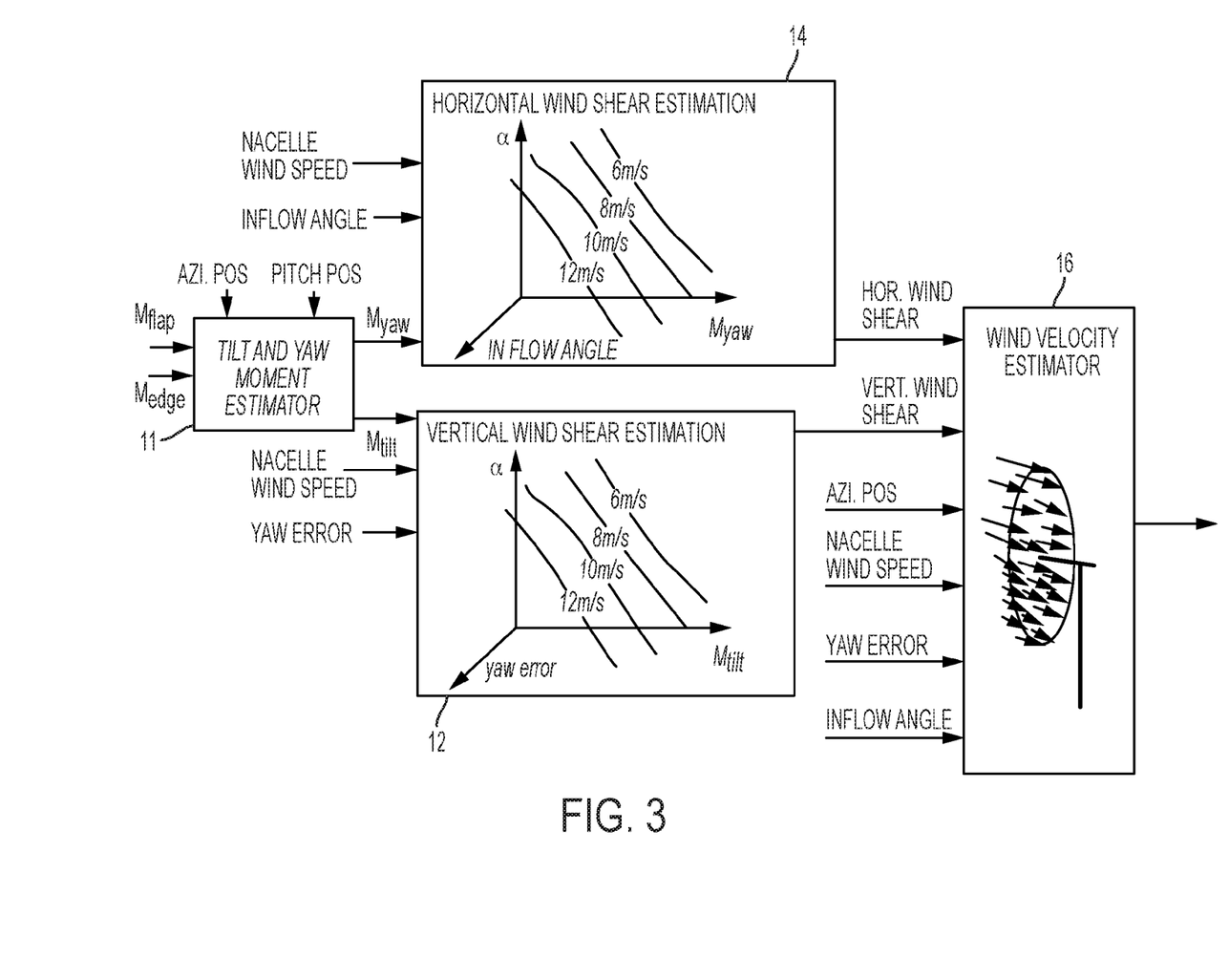
FIG. 3 is a schematic view of a generalised case of the estimator of FIG. 1 which can estimate horizontal and vertical shear.

Referring to FIG. 3, there is shown a generic embodiment which may be used to estimate either vertical or horizontal wind shear. As before, the vertical shear is estimated from an estimate of tilt moments based on flapwise and edgewise blade bending moments, pitch position and azimuth position. However, horizontal shear may also be estimated by using the blade flapwise and edgewise bending moments, the blade pitch positions and the azimuth positions to estimate yaw moments. The yaw moment is defined as the main bearing moment around the z axis. In FIG. 3 this is represented by tilt and yaw moment estimator 11 which has as its inputs the blade flap and edge moments $M_{flap}$ 1, 2 and 3, and $M_{edge}$ 1, 2 and 3 together with Azimuth and Pitch position as in FIG. 1.

The vertical wind shear estimation is made as in FIG. 1, except that the estimate may be improved by taking into account a yaw error, being a measure of the misalignment of the rotor with the direction of the wind. Thus, in FIG. 2, the vertical wind shear estimation 12 is shown as having nacelle wind speed, yaw error and tilt moment inputs, and a vertical wind shear output $α_v$.

The wind speed may be calculated by a variety of techniques as mentioned above and may be measured at a location other than the nacelle.

The horizontal wind shear estimator 14 takes as its input, the yaw moment, $M_{yaw}$ provided by the yaw moment estimator. This moment is used, with the nacelle wind speed measurement, or other wind speed measurement as described, to estimate horizontal wind shear. Although not essential, the estimation may be improved by taking into account the inflow angle which is shown as a third input into the estimator. The inflow angle is the angle at which the mean air flow comes into the rotor. As with the vertical shear estimator, the horizontal wind shear estimator may comprise a store of curves of the yaw moment against horizontal wind shear at various wind speeds.

In an alternative embodiment, the tilt and/or yaw moments could be measured directly, for example using strain gauges.

In the FIG. 3 generalisation, the yaw error and the inflow angle induce an additional tilt and yaw moment which is taken into account in the respective transfer function, but may be omitted.

Thus, the wind shear is estimated based on a determination of blade loading. This loading may be the blade flap load and the blade edge load. The edge load may be estimated rather than measured. The flap load may also be estimated but modern wind turbines generally have sensors available to measure the load.

As shown in FIG. 3, the horizontal wind shear signal $\alpha_h$ and the vertical wind shear signal $\alpha_v$ may be used to estimate the wind velocity vector at any position on the rotor plane. This is represented in FIG. 3 by a wind velocity estimator 16 which determines wind velocity over the rotor plane and which has inputs of azimuth position, wind speed, yaw error and inflow angle and output a wind velocity.

Figure 7:
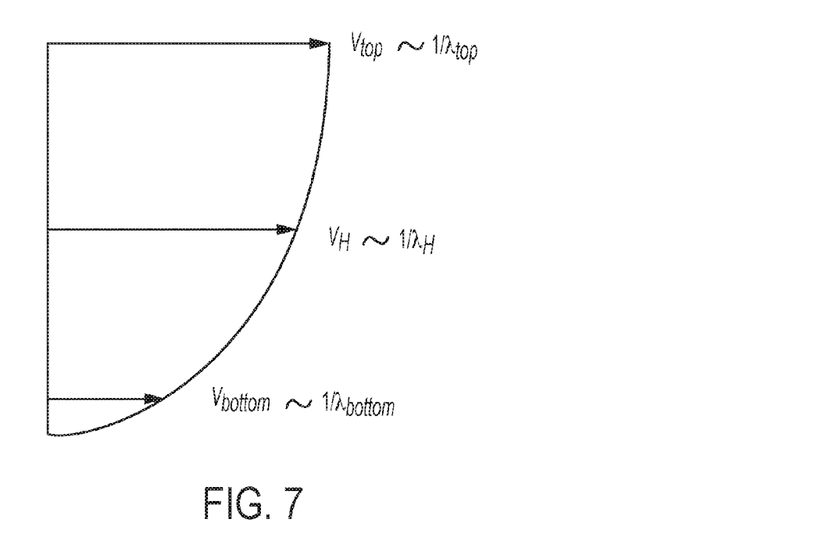
FIG. 7 is a schematic view illustrating how vertical wind shear affects tip speed ratio.

The inflow angle may be measured or determined from the terrain on which the wind turbine is mounted. The yaw error may be measured from a wind direction sensor. In order to calculate the wind velocity vectors, the rotor velocity estimator requires a wind shear profile model. Various models may be used. For calculation of horizontal wind shear a linear profile may be used; for calculation of vertical wind shear a logarithmic wind profile or power law profile may be used as specified in IEC61400-1-ed3, Section 3.62. Other profiles are possible. An example is shown in FIG. 7 described below.

Figure 4:
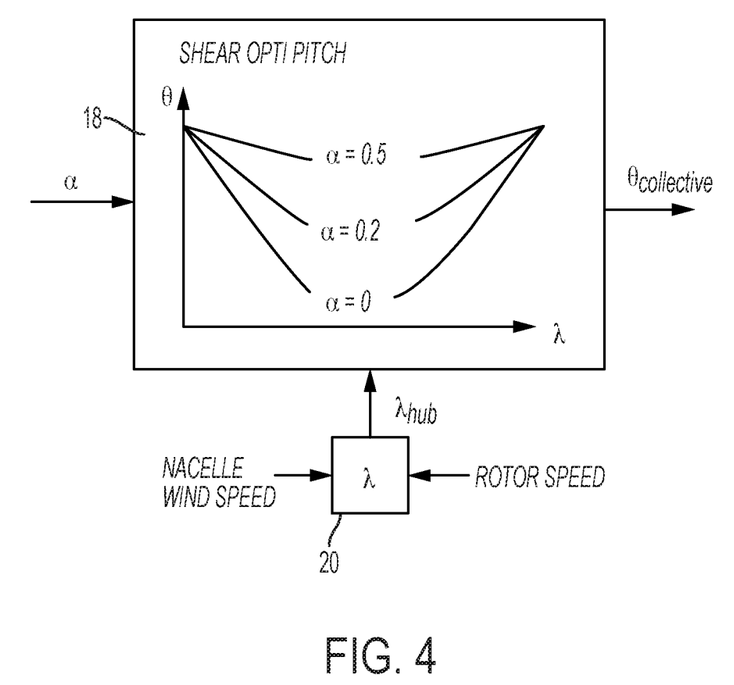
FIG. 4 is a schematic view of a shear dependent collective pitch controller embodying the invention.

The estimated wind velocity is used to calculate the optimal tip speed ratio $\lambda$ and pitch angle $\theta$. This optimum may be found for a collective pitch angle or individual blade pitch angles. An example of a collective pitch controller is FIG. 4. The input to pitch calculator 18 is the estimated wind shear value $\alpha$. This may be the vertical wind shear $\alpha_v$, the horizontal wind shear $\alpha_h$ or both. The estimate of wind velocity as described above is used, together with the measured wind speed to determine the tip-speed ratio $\lambda$ at unit 20 and the collective pitch reference is generated from a set of optimised curves of tip speed ratio to pitch angle ($\lambda$:$\theta$) for a given value of wind shear. These optimised curves are predetermined curves which are pre-stored in a memory of the control system.

Figure 5:
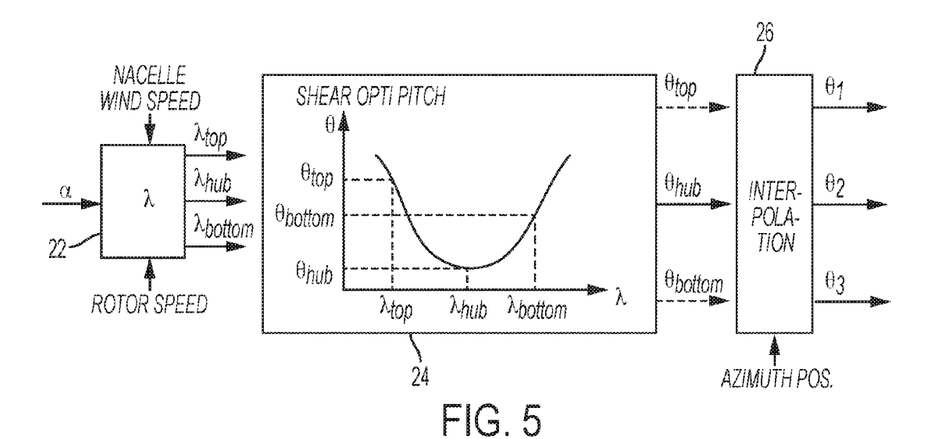
FIG. 5 is a schematic view of a shear dependent individual blade pitch controller embodying the invention.

FIG. 5 shows an example of an individual blade pitch controller based on a wind shear input. In this example, the optimal individual pitch angle is determined for a specific blade position in the rotor plane. Thus, as a blade rotates, the optimum pitch angle, based on estimated wind shear changes. Thus, in FIG. 5, the tip speed ratio calculator 22 has inputs of estimated wind shear (either vertical and/or horizontal), estimated wind velocity as described above, and measured wind speed. It then calculates the tip speed ratios at the top and bottom of the rotor plane ($\lambda_{top}$ and $\lambda_{bottom}$) and at the hub ($\lambda_{hub}$). These three values form the inputs to a pitch angle calculator 24 which calculates the optimum pitch angles at the top, bottom and hub positions based on the tip speed ratio inputs and a predetermined optimum curve of tip speed ratio to pitch angle ($\lambda$:$\theta$). This optimum curve is also pre-stored in a memory of the controller. The pitch angle calculator 24 outputs pitch angles for the three positions, $\theta_{top}$, $\theta_{hub}$, $\theta_{bottom}$ which are provided to an interpolation unit which calculates actual pitch angles $\theta_1$, $\theta_2$, $\theta_3$ based on the calculated values and an azimuth position input.

Figure 6:
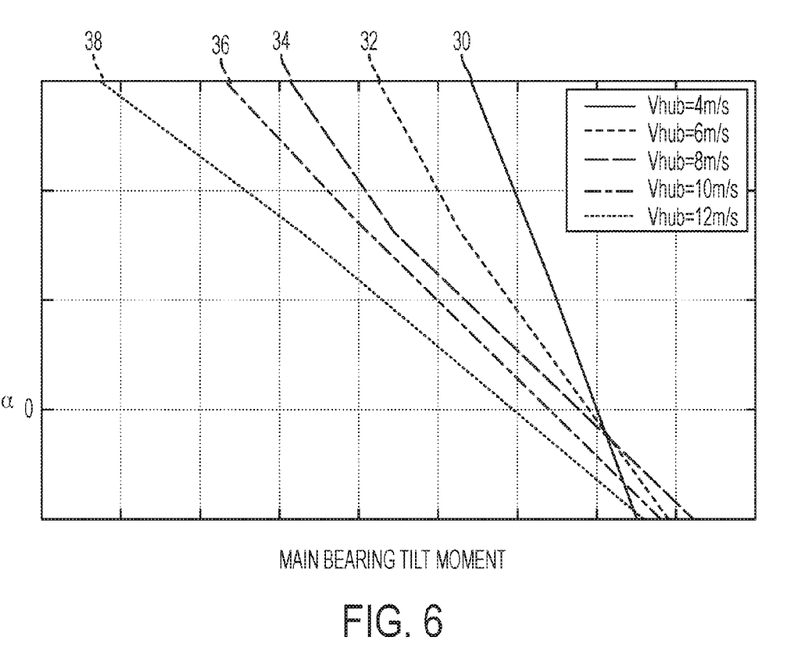
FIG. 6 is a graph showing the correlation between tilt moment and wind shear.

Referring back to FIGS. 1 and 3, the estimation of vertical wind shear is based on an estimation of tilt moments. The tilt moment is calculated from the flapwise and edgewise blade moments, for example the flapwise/edgewise blade root moments. These moments may be measured using blade load sensors which are well known in the art. A strain gauge is one example of many suitable sensors and are usually located at the blade root although other locations are possible FIG. 6 shows a correlation between the main bearing tilt moment and the wind shear exponent for a power law profile. The correlations are shown at a range of wind speeds with curve 30 relating to a wind speed Vhub=4 m/s; curve 32 relating to a wind speed Vhub=6 m/s; curve 34 relating to a wind speed Vhub=8 m/s; curve 36 relating to a wind speed Vhub=10 m/s and curve 38 relating to a wind speed Vhub=12 m/s. The main bearing is the bearing connecting the rotor to the main shaft.

Although not shown, the yaw moment is used similarly to calculate the horizontal wind shear and there is a similar correlation between the horizontal wind shear exponent and the yaw moment.

The individual pitch controller of FIG. 5 will now be discussed in more detail. The following discussion relates to vertical shear estimation but is equally applicable to horizontal or horizontal and vertical shear estimation.

FIG. 7 shows a curve of wind speed and tip speed ratio at different heights along the wind turbine rotor plane in conditions of high positive wind shear. The wind speed at the bottom of the rotor plane is lowest due to ground effects and increases towards the top. The tip speed ratio is proportional to the inverse of the wind speed. Thus, as shown in FIG. 7, $V_{bottom} \sim 1/\lambda_{bottom}$; $V_H \sim 1/\lambda_H$; and $V_{top} \sim 1/\lambda_{top}$. Thus, the tip speed ratio $\lambda$ varies across the plane of the rotor. This follows as the tip speed is the same for all positions in the rotor plane and so the tip speed ratio decreases at the top of the rotor plane compared to the hub and increases at the bottom of the rotor plane.

Figure 8:
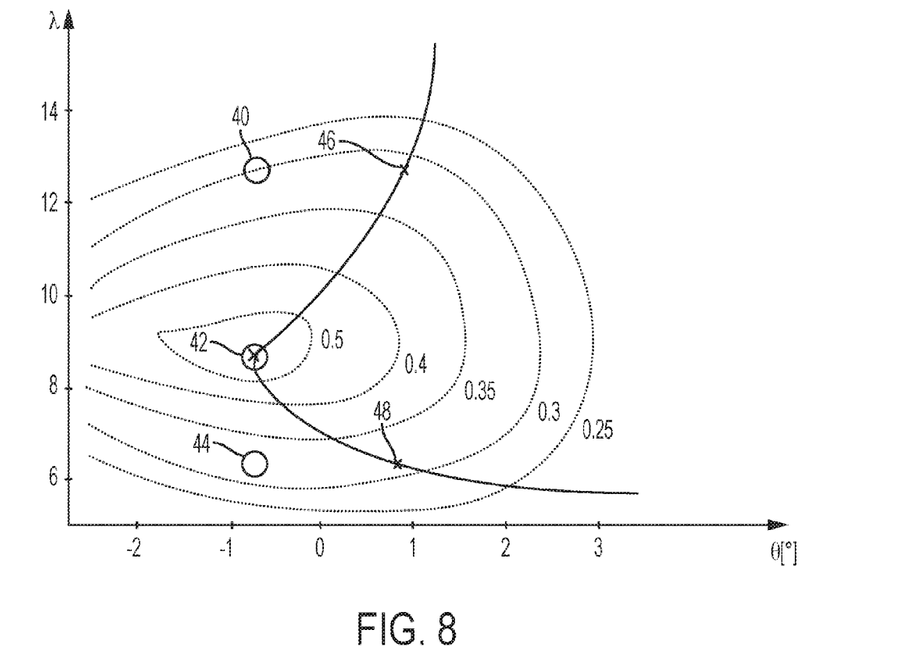
FIG. 8 shows a power coefficient surface for collective and individual pitch controllers.

FIG. 8 illustrates the advantages of wind shear dependent individual blade pitching. FIG. 8 shows the power coefficient surface Cp ($\lambda$, $\theta$). In FIG. 8, values are shown for a measured hub wind speed of 10 m/s, and an estimated vertical shear $\alpha$=0.6. References 40, 42, 44 indicate set points at the bottom, hub and top rotor plane positions respectively using a collective pitch angle control. Set point 42 is the hub set point which is used in known systems to determine a collective pitch angle based on hub wind speed to optimise the power coefficient.

Set points 46, 42, 48 are the operating points for individual pitch control. Set point 42 is the hub set point and is the same value as the collective example and the prior art example that only uses hub speed. However, the top and bottom operating points 46, 48 are at markedly different pitch angles. It will be noted that the three operating points 46, 42, 48 lie on a curve 50 of optimal pitch angle to tip speed ratio. It will be noted that in the collective control example at the top of the rotor plane the turbine is operating in a stall (set point 44) and that at the bottom the wind is being blocked due to high induction (set point b 40). By using individual pitch angle control, the turbine can operate along the optimal pitch angle:tip speed ratio ($\theta$:$\lambda$) curve and therefore increase the overall Cp value.

Figure 9:
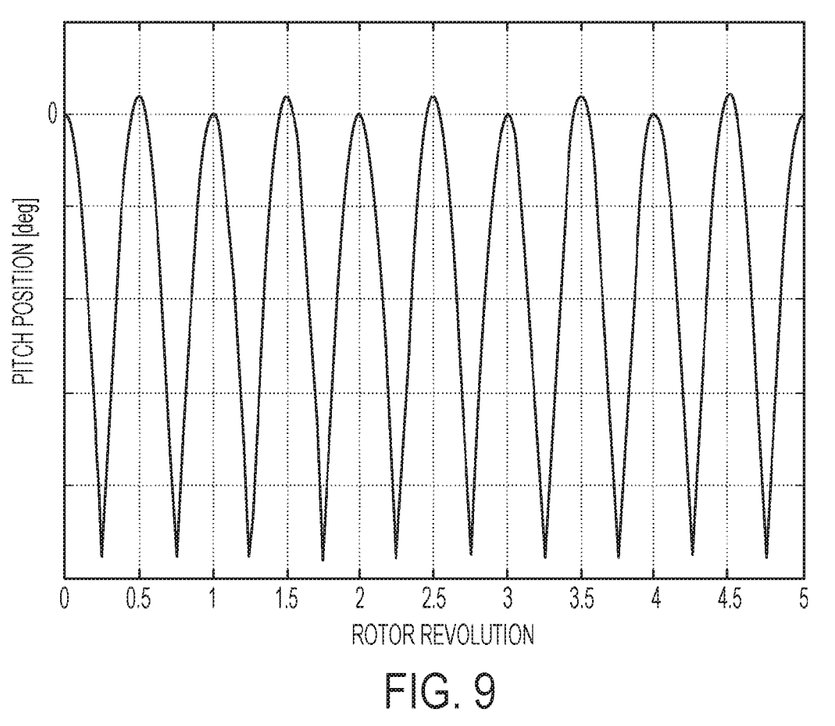
FIG. 9 is a graph of rotor revolution and pitch position illustrating cyclic pitch control.

FIG. 9 shows how the individual pitch reference is cyclic. As an example, for a shear coefficient of 0.6, a 2P pitch reference is presently considered optimal as illustrated in FIG. 9 where P is the fundamental rotor frequency. This figure shows a pitch curve that is optimised for maximum Cp. In practice it may be necessary to smooth the transitions between the upper and lower parts of the rotor plane.

Figure 10:
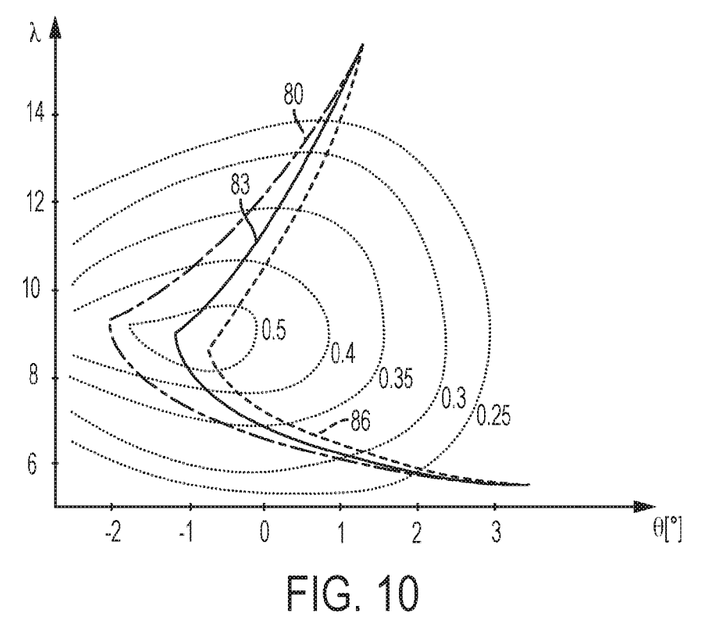
FIG. 10 shows a shear dependent opti-θ-λ curve.

Individual cyclic pitching causes increased pitch activity which may have adverse consequences in areas such as pitch bearing lifetime. A collective shear dependent optimised pitch angle:tip speed ratio curve may provide a lower Cost of Energy (CoE) over the lifetime of a turbine. This curve is derived by calculating a Cp optimal collective pitch angle for various values of tip speed ratio at hub height and is illustrated in FIG. 10 This figure is a map of the Cp surface similar to FIG. 8 with optimum shear dependent curves shown for vertical shears of $\alpha$=0, 0.3, and 0.6 at curves 80, 83, and 86 respectively.

As with the previous example, the results relate to vertical wind shear, but apply also to horizontal wind shear dependent pitch control or horizontal and vertical wind shear dependent pitch control.

Many variations to the embodiments described are possible and will occur to those skilled in the art without departing from the scope of the invention. In one variant, rather than estimating a component of wind shear, whether vertical or horizontal, the component of wind shear could be pre-determined off line and included as a pre-set parameter in the turbine.

What is claimed is:

1. A method of controlling a wind turbine having a rotor and a plurality of rotor blades, comprising:
   obtaining a wind speed value;
   determining, using one or more processors, blade loading, comprising determining blade bending moments;
   estimating a component of vertical wind shear across a rotor plane based on the wind speed value, an estimate of main bearing tilt moment derived from the blade bending moments, a measure of blade pitch, and azimuth angle;
   estimating a wind velocity over the rotor plane based on the component of vertical wind shear;
   determining a tip speed ratio based on a speed of rotation of a tip of the rotor blades, the wind speed value and the estimated wind velocity over the rotor plane;
   selecting a curve of tip speed ratio versus blade pitch angle based on the estimated vertical wind shear component;
   selecting a blade pitch angle based on the selected curve and the tip speed ratio;
   automatically adjusting a blade pitch of the wind turbine in accordance with the selected blade pitch angle; and
   operating the wind turbine using the adjusted blade pitch.

2. A method according to claim 1, wherein the vertical wind shear is further estimated from a measure of yaw error.

3. A method according to claim 1, wherein the wind speed value is the wind speed determined at a nacelle of the wind turbine.

4. A method according to claim 1, wherein the blade pitch angle is a collective blade pitch angle applied to adjust all of the plurality of rotor blades.

5. A method according to claim 1, wherein the blade pitch angle is an individual blade pitch angle and the selection of the blade pitch angle is performed for each of the plurality of rotor blades.

6. A method according to claim 5, wherein tip speed ratio is determined at a plurality of positions on the rotor plane and the blade pitch angle selected for each of the plurality of positions.

7. A method of controlling a wind turbine having a rotor and a plurality of rotor blades, comprising:
   obtaining a wind speed value;
   determining, using one or more processors, blade loading comprising determining blade bending moments;
   estimating a component of horizontal wind shear across a rotor plane based on an estimate of main bearing yaw moment derived from the blade bending moments, azimuth angle, and blade pitch position;
   estimating a wind velocity over the rotor plane based on the component of horizontal wind shear;
   determining a tip speed ratio based on a speed of rotation of a top of the rotor blades, the wind speed and the estimated wind velocity over the rotor plane;
   selecting a curve of tip speed ratio versus blade pitch angle based on the estimated horizontal wind shear component;
   selecting a blade pitch angle based on the selected curve and the tip speed ratio;
   automatically adjusting the blade pitch in accordance with the selected blade pitch angle; and
   operating the wind turbine using the adjusted blade pitch.

8. A method according to claim 7, wherein the horizontal wind shear is estimated from the yaw moment, the wind speed and a measure of inflow angle.

9. A control system for a wind turbine having a rotor and a plurality of rotor blades, the control system comprising:
   a blade load sensor;
   an azimuth position sensor;
   a blade pitch position sensor;
   a processor;
   a memory storing a program which, when executed on a processor, performs an operation comprising:
      determining flapwise blade bending moments based on signals from the blade load sensors;
      determining an estimate of main bearing tilt moment based on the flapwise blade bending moments and a blade pitch position and azimuth position;
      estimating a component of vertical wind shear based on the main bearing tilt moment and a wind speed;
      estimating a wind velocity over a rotor plane based on the component of vertical wind shear;
      determining a tip speed ratio based on a speed of rotation of a tip of the rotor blades, the estimated wind velocity over the rotor plane, and a set of curves of tip speed ratio and blade pitch reference for a given vertical wind shear; and
      determining a blade pitch angle from one of the set of curves based on the estimated vertical wind shear component and the tip speed ratio; and
   a controller operable to adjust a pitch angle of at least one of the rotor blades in accordance with the determined blade pitch angle.

10. A control system according to claim 9, comprising a yaw error sensor, wherein the processor further estimates vertical wind shear based on sensed yaw error.

11. A control system according to claim 9, wherein the wind speed is measured by a sensor located at a nacelle of the wind turbine.

12. A control system according to claim 9, wherein the controller is operable to generate a collective pitch angle reference to adjust the pitch angle of all of the plurality of rotor blades.

13. A control system according to claim 9, wherein the controller is operable to generate an individual pitch angle reference to adjust the pitch angle of each of the rotor blades individually.

14. A control system according to claim 13, wherein the operation further comprises:
   determining the tip speed ratio of a plurality of positions on the rotor plane; and
   determining a pitch angle for each of the plurality of positions.

15. A control system according to claim 14, wherein the plurality of positions on the rotor plane comprises top, bottom and hub positions of the rotor plane.

16. A control system for a wind turbine having a rotor and a plurality of rotor blades, the control system comprising:
   a blade load sensor;
   an azimuth position sensor;
   a blade pitch position sensor;

a processor;
a memory storing a program which, when executed on the processor, performs an operation comprising:
  determining bending moments based on signals from the blade load sensors;
  determining an estimate of main bearing yaw moment based on the blade bending moments, the azimuth position and the blade pitch position;
  estimating a component of horizontal wind shear based on the yaw moment, a sensed wind speed and a measure of inflow angle;
  estimating a wind velocity over a rotor plane based on the component of horizontal wind shear;
  determining a tip speed ratio based on a speed of rotation of a tip of the rotor blades, a measure of wind speed, the estimated wind velocity over the rotor plane, and a set of curves of tip speed ratio and blade pitch reference for a given wind shear; and
  determining a blade pitch angle from one of the set of curves based on the estimated horizontal wind shear component and the tip speed ratio; and
a controller operable to adjust a pitch angle of at least one of the rotor blades in accordance with the determined blade pitch angle.

17. A wind turbine comprising a rotor, a plurality of rotor blades and a control system according to claim 9.

* * * * *